US 8,250,202 B2

(12) United States Patent
Kaminsky et al.

(10) Patent No.: US 8,250,202 B2
(45) Date of Patent: Aug. 21, 2012

(54) DISTRIBUTED NOTIFICATION AND ACTION MECHANISM FOR MIRRORING-RELATED EVENTS

(75) Inventors: David L. Kaminsky, Chapel Hill, NC (US); David M. Ogle, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 3175 days.

(21) Appl. No.: 10/336,188

(22) Filed: Jan. 4, 2003

(65) Prior Publication Data

US 2004/0133670 A1 Jul. 8, 2004

(51) Int. Cl.
*G06F 15/173* (2006.01)
(52) U.S. Cl. .......................... 709/224; 709/248; 714/48
(58) Field of Classification Search .......... 709/223–224, 709/248; 714/4, 6, 48; 711/162
See application file for complete search history.

(56) References Cited

U.S. PATENT DOCUMENTS

| 5,488,731 | A | 1/1996 | Mendelsohn | 395/800 |
|---|---|---|---|---|
| 5,546,574 | A | 8/1996 | Grosskopf et al. | 395/600 |
| 5,613,106 | A | 3/1997 | Thurman et al. | 395/620 |
| 5,881,135 | A | 3/1999 | Watts et al. | 379/88.02 |
| 5,928,367 | A * | 7/1999 | Nelson et al. | 714/6 |
| 6,021,508 | A | 2/2000 | Schmuck et al. | 714/4 |
| 6,138,139 | A | 10/2000 | Beck et al. | 709/202 |
| 6,173,377 | B1 * | 1/2001 | Yanai et al. | 711/162 |
| 6,182,198 | B1 | 1/2001 | Hubis et al. | 711/162 |
| 6,249,755 | B1 | 6/2001 | Yemini et al. | 702/183 |
| RE37,364 | E | 9/2001 | Cohn et al. | 714/6 |
| RE37,601 | E | 3/2002 | Eastridge et al. | 714/6 |
| 6,397,292 | B1 * | 5/2002 | Venkatesh et al. | 711/114 |
| 2001/0044879 | A1 | 11/2001 | Moulton et al. | |
| 2002/0022952 | A1 | 2/2002 | Zager et al. | |
| 2002/0059309 | A1 | 5/2002 | Loy et al. | |
| 2002/0087734 | A1 * | 7/2002 | Marshall et al. | 709/310 |
| 2003/0158998 | A1 * | 8/2003 | Smith | 711/112 |
| 2004/0024979 | A1 * | 2/2004 | Kaminsky et al. | 711/162 |
| 2004/0034795 | A1 * | 2/2004 | Anderson et al. | 713/201 |
| 2004/0205310 | A1 * | 10/2004 | Yamagami | 711/162 |
| 2005/0022051 | A1 * | 1/2005 | Zane et al. | 714/6 |

* cited by examiner

*Primary Examiner* — Abdullahi Salad
(74) *Attorney, Agent, or Firm* — Ido Tuchman

(57) ABSTRACT

A method, system, and computer code for administrating a data mirroring relationship between a first node and a second node. The invention includes an event coordinator configured to receive a notification from the first node when an event that may potentially affect the mirroring relationship has occurred, and to perform a predetermined task in response to the notification. The predetermined task may include logging the event that occurred at the first node, notifying the second node that the event occurred at the first node, and notifying a system administrator that the event occurred at the first node.

21 Claims, 3 Drawing Sheets

DISTRIBUTED NOTIFICATION AND ACTION MECHANISM FOR MIRRORING-RELATED EVENTS

FIELD OF THE INVENTION

The present invention relates generally to computer networks, and more specifically to administrating data mirroring relationships among nodes in a network environment.

BACKGROUND

Over the past decades computers have become one of the most important tools in modern society. Computers help create, manipulate and disseminate information essential to industrial, governmental and educational facilities throughout the world. In order to protect important information stored on computers (also referred to as nodes) from being unintentionally deleted, corrupted, or destroyed, many data backup systems have been developed to safeguard information stored in computer memory.

One technique developed to protect against data loss is data mirroring. Data mirroring essentially involves protecting stored information at a local storage device by making duplicate copies of the information at one or more remote storage devices. If some unfortunate circumstance causes information at the local storage device to be lost, the remote storage device can be used to recover the information. Generally, data mirroring schemes are configured to work in the background by copying local information automatically without user intervention. This helps ensure that the backup information is as current as possible without burdening the computer user.

Although data mirroring has proven a valuable defense against data loss, mirroring operations may nevertheless fail under certain conditions. Consider, for example, when a local storage device is upgraded to increase its storage capacity. Such storage expansion is common as computer technology rapidly advances each year. If the upgraded storage device is capable of storing more data than the remote storage device onto which data is mirrored, the mirroring relationship will fail when the remote device reaches its storage limit before the local storage device.

One way to avoid such data mirroring problems is for system administrators to double check whether changes to either the local or remote computers will cause adverse affects to the mirroring relationship before the changes are implemented. Although this solution works well for small computer networks, it generally becomes too difficult for administrators to check every system change for larger networks with hundreds of mirrored computers. Moreover, there may be events occurring in the system that the administrator is normally unaware but still affect data mirroring relationships.

Another solution is to provide mirroring memory that is much larger than local memory. This solution strives to assure that backup memory will not run out even if the local memory is expanded. Such an arrangement, however, typically results in a poor utilization of system resources and does not guarantee that mirroring memory will not run out in the future. Furthermore, this arrangement does not take into consideration other events in the computer system that may cause mirroring to fail. For example, a remote computer may have enough backup memory to mirror several local computers, but may run out of network bandwidth and therefore be unable to keep up with copy operations required to mirror local data. Thus, other events occurring in a computer mirroring system may require attention.

SUMMARY OF THE INVENTION

The present invention addresses the above-mentioned limitations of traditional data mirroring administration techniques by providing an event coordinator that automatically performs one or more corrective actions when a potentially problematic event to a data mirroring arrangement occurs.

Thus, an aspect of the present invention involves a method for administrating a data mirroring relationship between a first node and a second node. The method includes a receiving step to receive a notification when an event has occurred at the first node. A determining step is performed to determine whether the event may potentially affect the mirroring relationship. After the determination is made, a predetermined task in response to the notification is performed if the event potentially affects the mirroring relationship. The predetermined task may include logging the event that occurred at the first node, notifying the second node that the event occurred at the first node, and notifying a system administrator that the event occurred at the first node.

Another aspect of the invention is a system for administrating a mirroring relationship between a first node and a second node. The system includes an event coordinator configured to receive notification from the first node when an event that may potentially affect the mirroring relationship has occurred, and to perform a task in response to the notification if the event potentially affects the mirroring relationship. As mentioned above, the task may include logging the event that occurred at the first node, notifying the second node that the event occurred at the first node, and notifying a system administrator that the event occurred at the first node.

Yet another aspect of the invention is a computer program product embodied in a tangible media. The program product includes computer readable program codes coupled to the tangible media for administrating a data mirroring relationship between a first node and a second node. The program codes are configured to receive a notification when an event has occurred at the first node, determine whether the event may potentially affect the mirroring relationship, and perform a task in response to the notification if the event potentially affects the mirroring relationship.

A further aspect of the invention is a system for administrating a data mirroring relationship between a first node and a second node. The system includes a means for receiving a notification when an event has occurred at the first node. The system also utilizes a means for determining whether the event may potentially affect the mirroring relationship, and a means for performing a predetermined task in response to the notification if the event potentially affects the mirroring relationship.

The foregoing and other features, utilities and advantages of the invention will be apparent from the following more particular description of various embodiments of the invention as illustrated in the accompanying drawings.

DETAILED DESCRIPTION OF THE INVENTION

Figure 1:
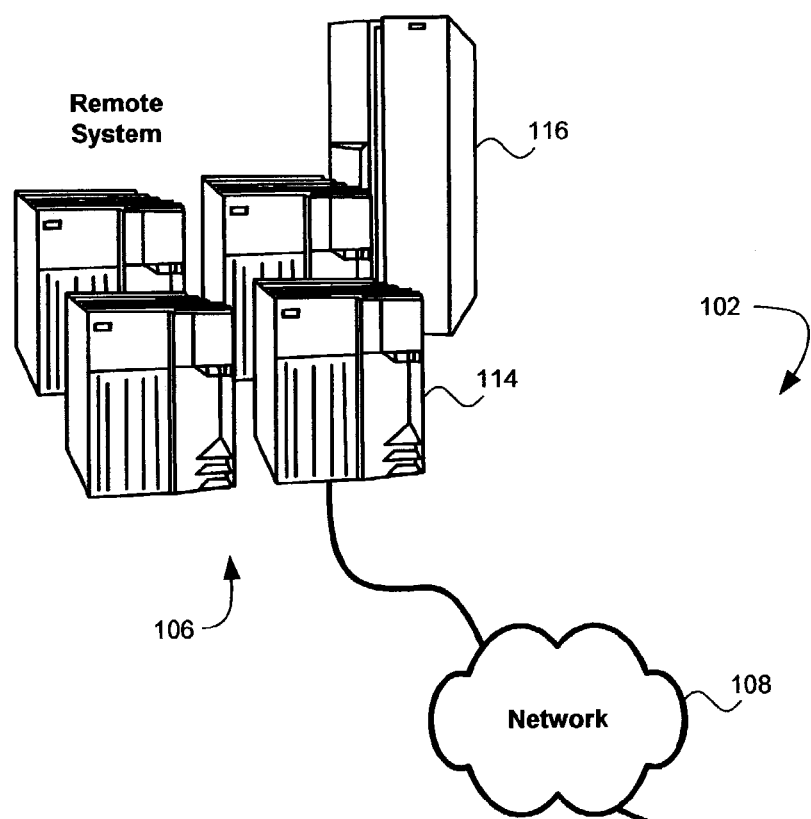
FIG. 1 shows an exemplary network environment embodying the present invention.
Figure 1:
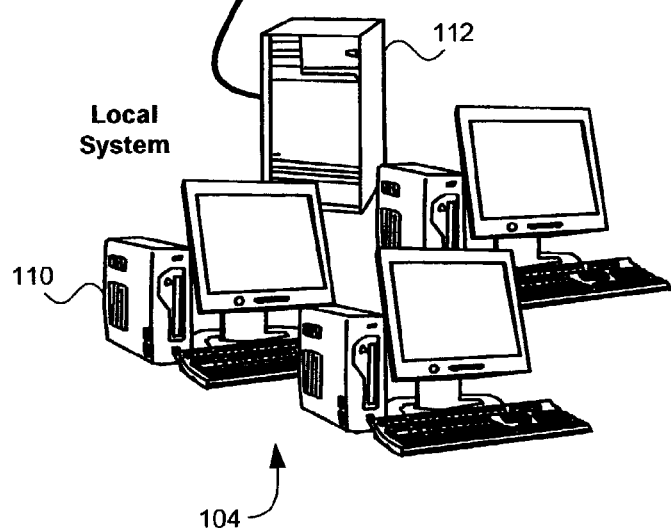

As discussed in detail below, the present invention helps detect and communicate system changes that may potentially cause problems to a mirroring relationship between computer system nodes. Once detection and notification of a potential problem occurs, corrective actions can be taken to maintain the mirroring relationship. The corrective actions may include alerting a system administrator, executing program code, and/or logging the event in a file. The invention is described herein with reference to FIGS. 1-3. When referring to the figures, like structures and elements shown throughout are indicated with like reference numerals.

In FIG. 1, an exemplary network environment 102 embodying the present invention is shown. It is noted that the network environment 102 is presented for illustration purposes only, and is representative of countless system configurations in which the invention may be implemented. Thus, the present invention should not be considered limited to the configurations shown and discussed herein.

The network environment 102 includes a local computer system 104 and a remote computer system 106 connected via a computer network 108. The computer network 108 may be any network known in the art for effectuating communications between the local system 104 and the remote system 106. Thus, the network 108 can be a local area network (LAN), a wide area network (WAN), or a combination thereof. It is contemplated that the network 108 may be configured as a public network and/or private network, and may include various topologies and protocols know to those skilled in the art.

The local system 104 includes one or more local nodes 110 coupled to the network 108. As discussed in more detail below, the local nodes 110 can contain one or more data storage devices (not shown) for storing information. The information in some or all of the data storage devices is backed-up or "mirrored" in the remote system 106 through the network 108. The local system may also include a local server 112. The local server 112 can act as a central point within the local system 104 where data mirroring functions are controlled.

The remote system 106 includes one or more remote nodes 114 coupled to the network 108. The remote nodes 114 contain storage devices (not shown) that are configured to mirror data stored at the local system 104. For example, the remote nodes 114 may contain multiple disk drives, tape cartridges, and other storage devices known in the art. In some cases, the remote nodes 114 are configured to function together as a mass storage facility, such as a storage area network (SAN), dedicated to data mirroring. The remote nodes 114 may be controlled and administrated centrally by a remote server 116.

As described below, the present invention helps detect system changes at the local system 104 and remote system 106 that may adversely affect an established data mirroring relationship. For example, if the hard disk size at a local node 104 is increased beyond the disk capacity at the remote system 106, the invention can alert a system administrator that the increased disk size may cause mirroring to fail. The system administrator can then take corrective measures, such as increasing the remote system storage capacity to ensure mirroring is maintained. In addition, the invention may be configured to automatically perform one or more tasks in response to a potentially problematic event. For example, program code may be executed or the event may be automatically logged in a text file.

Figure 2:
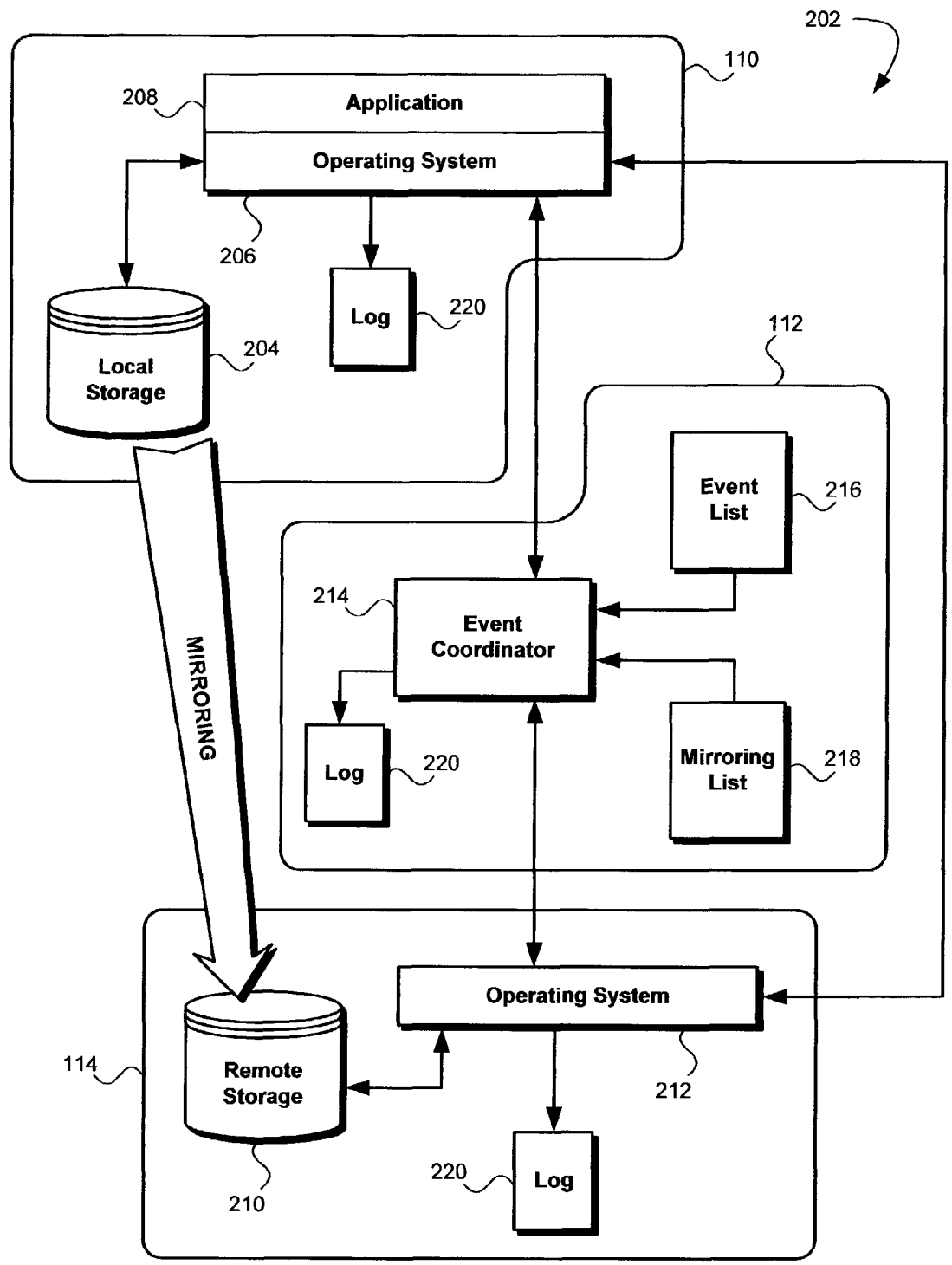
FIG. 2 shows an exemplary computer system embodying the present invention.

In FIG. 2, an exemplary computer system 202 contemplated by the present invention is shown. As mentioned above, the system 202 may include a local node 110, a remote node 114, and a local server 112. The local node 110 contains one or more local storage devices 204. The local storage device 204 may be any storage mechanism for retaining computer information, and can include random-access memory (RAM), Flash memory, disk drives, tape drives, and optical drives. A local operating system 206 typically controls the local storage device 204 and supports various program applications 208 running on the local node 110. The operating system 206 may be, for example, the Unix operating system or the Windows NT® operating system. Windows NT is a registered trademark of Microsoft Corporation.

Information on the local storage device 204 is mirrored to a remote storage device 210 at the remote node 114. The type of mirroring performed can be continuous, snapshot, or any other mirroring arrangement known to those skilled in the art. The remote node 114 includes a remote operating system 212 that controls the operations of remote storage device 210. Other configurations of the invention may include an operating system running on the remote storage device 210, such as IBM's Enterprise Storage Server. In one embodiment of the invention, the remote operating system 212 communicates with the remote storage device 210 through a high-speed connection, such as fibre channel loops or a small computer system interface (SCSI) bus.

Both the local node 110 and the remote node 114 communicate with an event coordinator 214. As shown, the event controller 208 may be embodied at the local server 112. It is contemplated, however, that the event controller 208 may be embodied elsewhere in the system 202, such as in the local nodes 110, the remote nodes 114, or the remote server 116 (see FIG. 1). Furthermore, the event controller 208 may be incorporated into an operating system or may be designed as a separate application supported by the underlying operating system.

In one embodiment of the invention, the event coordinator 214 is configured to input a list of events that may adversely affect mirroring operations from an event list 216. It is contemplated that the event list 216 may be preconfigured with a list of events, and may be maintainable and updateable by a system administrator to reflect system changes. Thus, the system administrator is able to add and delete events to and from the event list 216.

Once the contents of the event list 216 are loaded into the event coordinator 214, they are communicated to local and remote nodes 110 and 114 within the system 202. In a particular configuration of the invention, the event list contents are communicated to the nodes specified in a mirroring list 218. The mirroring list 218 details system nodes in a data mirroring configuration, as well as their mirroring relationship to each other. It is contemplated that the mirroring list 218 is also maintainable by the system administrator.

After the event list 216 is passed to the local and remote nodes 110 and 114, the nodes listen for occurrences of the specified events. When a listed event occurs at one of the nodes (110 or 114), the node responds by notifying the event coordinator 214 of the event occurrence. The event coordinator 214, in turn, processes the notification and determines an appropriate response to the event occurrence so that the mirroring relationship is not disturbed.

For example, consider a scenario where the storage size of the local storage device 204 is increased from 40 GB to 80 GB. When the operating system 206 at the local node 110 senses the change in storage capacity, it checks this event against the events specified on the event list 216. If a change in storage capacity is specified in the event list 216, the operating system 206 informs the event coordinator 214 of the event's occurrence. In response, the event coordinator 214 may take various actions. The event coordinator 214 may send a message, via email or other notification service, informing the system administrator of a potential mirroring problem. The administrator can then make any necessary system adjustments, such as increasing the remote node's storage capacity Alternatively, the event coordinator 214 may look up the local node's mirroring partners using the mirroring list 218, and notify them of the event occurrence. Assuming the local node's mirroring partner is the remote node 114, the event coordinator 214 can notify the remote node 114 that a change potentially affecting the mirroring relationship has occurred at the local node 110. At this point the local and remote nodes 110 and 114 may communicate with each other to determine if the event does indeed affect their mirroring operations. For example, the remote node 114 may determine that the remote storage 210 has enough memory to handle the increased capacity at the local storage 204, and no further action is necessary. If the remote storage 210 is not large enough, a new data mirroring node may be assigned to handle data mirroring for the local storage 204. It is contemplated that the nodes may communicate with each other using the event coordinator as an intermediary, or the nodes may communicate with each other directly.

The present invention also supports event logging at the various system nodes and servers. When an event occurs at either the local node 110 or remote node 114 that may affect data mirroring, the event and the time of its occurrence can be logged in an event log file 220. A log file 220 may exist at the local server 112, the local node 110, the remote node 114, and/or any other location desired by the system 202. The log file 220 can assist system administrators to debug data mirroring problems.

Thus, the event coordinator 214 helps maintain data mirroring relationships in a computer system 202 by first receiving notifications of events that may potentially disrupt a data mirroring arrangement, and second, performing appropriate operations in response to such events. This automated process ensures that the system 202 is correctly configured for data mirroring and reduces the time and effort needed to manage a complex mirroring scheme by a system administrator.

Figure 3:
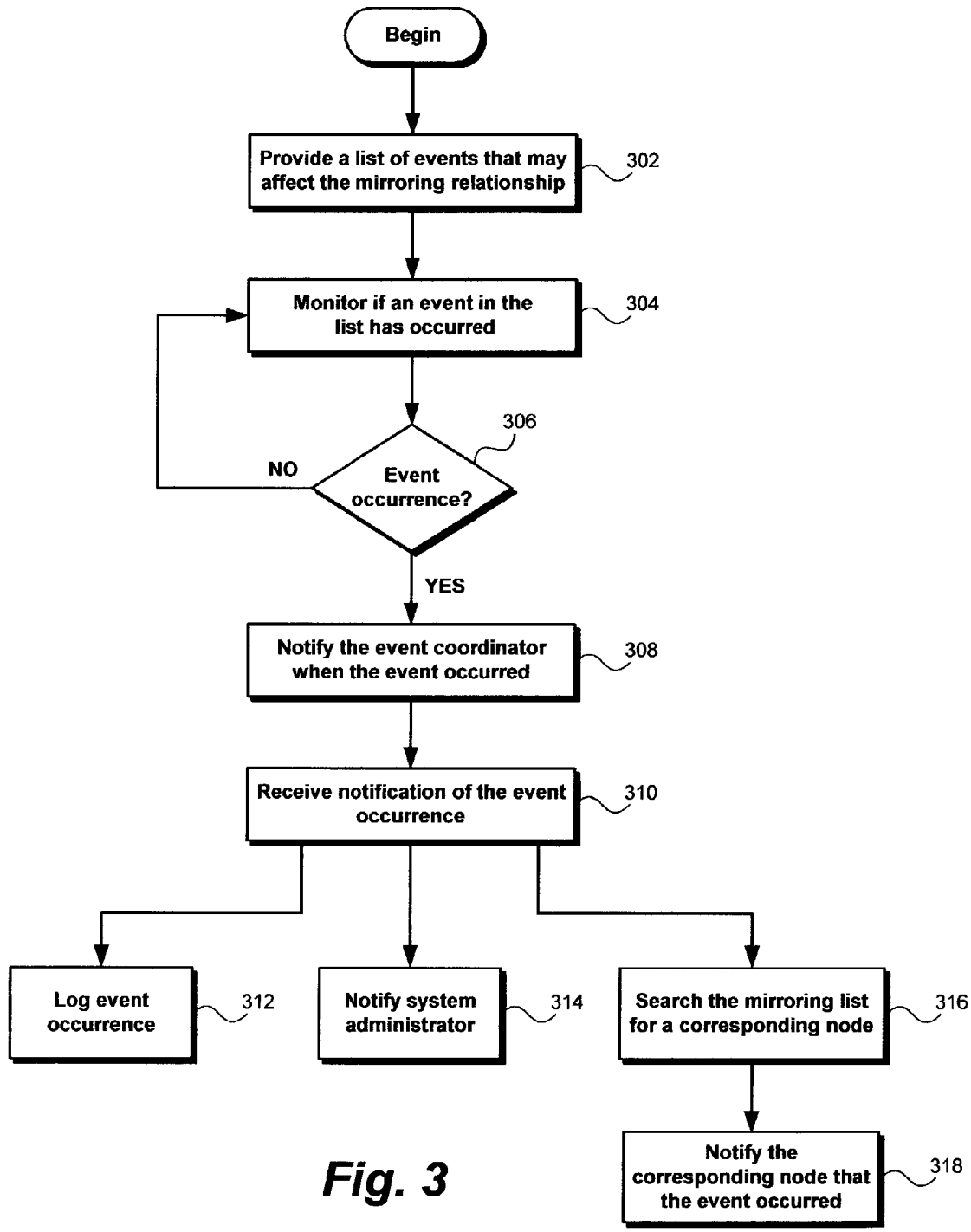
FIG. 3 shows an exemplary a flowchart diagram for administrating a data mirroring relationship between system nodes, as contemplated by the present invention.

In FIG. 3, a flowchart is shown containing operations performed by the computer system for administrating a data mirroring relationship between a first and second node, as contemplated by the present invention. It should be remarked that the logical operations of the computer system may be implemented (1) as a sequence of computer executed steps running on a computing system and/or (2) as interconnected machine modules within the computing system. The implementation is a matter of choice dependent on the performance requirements of the system implementing the invention. Accordingly, the logical operations making up the embodiments of the present invention described herein are referred to alternatively as operations, steps, or modules.

Operation flow begins with providing operation 302, in which an event coordinator provides the system nodes with a list of events that may affect the mirroring relationships within the system. The providing operation 302 may be part of an initial mirroring configuration, and can be repeated as new events that may interfere with mirroring are considered. It is also contemplated that the event coordinator may pass a different set of events to different nodes. The event list may be stored in an external file and, as mentioned above, may be updated and maintained by a system administrator. Entries in the event list may, for example, contain a local node identifier, a remote node identifier, one or more events to detect (storage expansion, network change, etc.), and one or more actions (log event, notify administrator, etc.) Once the list of events is provided to the appropriate system nodes, control passes to monitoring operation 304.

At monitoring operation 304, each node monitors its own status and listens for event occurrences enumerated in the event list. It is contemplated that various methods known to those skilled in the art may be utilized to listen to node events. If, at query operation 306, one of the listed events occurs, control flow passes to notifying operation 308. Otherwise, the system continues to check for events by returning to monitoring operation 304.

At notifying operation 308, the node informs the event coordinator that an event listed in the event list has occurred. The event occurrence may be published to a particular event coordinator or may be communicated to all event coordinators in the systems. The notification can include an indication of the host and application that published the event, along with an identifier for the action. After the notifying operation 308 is completed, control passes to receiving operation 310.

At receiving operation 310, the event coordinator receives the notification sent from the notifying node Once the notification is received, various actions may be performed according the specific event detected and the system configuration. For example, the system may, at logging operation 312, record the event occurrence in a log file. The log entry may identify the node where the event occurred, the notifying node's mirroring partner(s), and the time the event occurred. The system may alternatively or additionally alert the system administrator that a potentially problematic event has occurred at notification operation 314. The administrator notification may similarly identify the node where the event occurred, the node's mirroring partner, and when the event occurred.

Additionally, the event coordinator may, at searching operation 316, search a mirroring list for all system nodes in a mirroring relationship with the notifying node. As mentioned above, the mirroring list describes the mirroring relationships between various nodes within the system. The mirroring list may contain a list of source nodes, and for each source node, a list of mirroring target nodes. For example, the mirroring list may contain the following entries:

Source 1: target A, B
Source 2: target C
Source 3: target D, E, F

Once the mirroring list is accessed, the event coordinator can inform the mirroring nodes of the event occurrence at notifying operation 318. The notification may include the network address of the original node (e.g., hostname and event coordinator's port or URL for a servlet) along with an identifier for the interested application. Nodes receiving notification of the event occurrence can choose to ignore the event, send an advisory message back to the original node, or send a request for action to the original node. The even coordinator may optionally log the responses.

Upon receiving the responses, the event coordinator may notify the original node. Applications at the original node can choose to respond to such notifications according to their own policy, but appropriate action is assumed. For example, if a mirroring node notifies the original node that an event will likely cause mirroring to fail (e.g., a logical unit (LUN) is expanded on the original node, but corresponding expansion on the mirroring node is impossible), then the original node should not complete its action.

Thus, the present invention beneficially detects system changes that may cause problems to an established mirroring relationship between computer system nodes automatically. An event control may be utilized to notify other nodes within the mirroring relationship of the even occurrence. The event control may also notify the system administrator of the event occurrence and log the event in a file.

The foregoing description of the invention has been presented for purposes of illustration and description. It is not intended to be exhaustive or to limit the invention to the precise form disclosed, and other modifications and variations may be possible in light of the above teachings. The embodiments disclosed were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

The invention claimed is:

1. A method for administrating a data mirroring relationship between a first node and a second node, the method comprising:
  receiving a notification when an event has occurred at the first node;
  determining whether the event can cause the mirroring relationship to fail;
  performing a predetermined task in response to the notification if the event can cause the mirroring relationship to fail; and
  wherein determining whether the event can cause the mirroring relationship to fail includes comparing the event against a list of events.

2. The method of claim 1, wherein the predetermined task performed is based on the event that occurred at the first node.

3. The method of claim 1, wherein performing the predetermined task further comprises logging the event that occurred at the first node.

4. The method of claim 1, wherein performing the predetermined task further comprises notifying the second node that the event occurred at the first node.

5. The method of claim 4, wherein notifying the second node further comprises searching a mirroring list for the second node in the mirroring relationship with the first node.

6. The method of claim 1, wherein performing the predetermined task further comprises notifying a system administrator that the event occurred at the first node.

7. A system for administrating a mirroring relationship between a first node and a second node, the system comprising:
  an event coordinator including a processor configured to:
   receive notification from the first node when an event that can cause the mirroring relationship to fail has occurred;
   perform a task in response to the notification if the event can cause the mirroring relationship to fail; and
   wherein determining whether the event can cause the mirroring relationship to fail includes comparing the event against a list of events.

8. The system of claim 7, further comprising a mirroring list coupled to the event coordinator, the mirroring list describing the mirroring relationship between the first node and the second node.

9. The system of claim 7, further comprising an event list identifying a plurality of system events that, if occurring at the first node, may potentially cause the mirroring relationship to fail.

10. The system of claim 9, further comprising an operating system coupled with the first node, the operating system configured to notify the event coordinator when a listed event in the event list has occurred at first node.

11. The system of claim 7, further comprising an operating system coupled with the second node, the operating system configured to receive notification when the event that may potentially affect the mirroring relationship has occurred.

12. The system of claim 7, wherein the event coordinator is further configured to notify a system administrator that the event has occurred at the first node.

13. The system of claim 7, wherein the event coordinator is further configured to log the occurrence of the event in a log document.

14. The system of claim 7, wherein the event coordinator is further configured to notify the second node that the event has occurred at the first node.

15. The system of claim 14, further comprising a mirroring list coupled to the event coordinator, the mirroring list indicating the mirroring relationship between the first node and second node.

16. A computer program product embodied in a non-transitory tangible media comprising:
  computer readable program codes coupled to the tangible media for administrating a data mirroring relationship between a first node and a second node, the computer readable program codes configured to cause the program to: receive a notification when an event has occurred at the first node;
  determine whether the event can cause the mirroring relationship to fail;
  perform a task in response to the notification if the event can cause the mirroring relationship to fail; and
  wherein determining whether the event can cause the mirroring relationship to fail includes comparing the event against a list of events.

17. The computer program product of claim 16, wherein the computer readable program code to perform a task in response to the notification further comprises computer readable program code configured to cause the program to log the event that occurred at the first node.

18. The computer program product of claim 16, wherein the computer readable program code to perform a task in response to the notification further comprises computer readable program code configured to cause the program to notify the second node that the event occurred at the first node.

19. The computer program product of claim 18, wherein the computer readable program code to notify the second node that the event occurred at the first node further comprises computer readable program code configured to cause the program to search a mirroring list for the second node in the mirroring relationship with the first node.

20. The computer program product of claim 16, wherein the computer readable program code to perform a task in response to the notification further comprises computer readable program code configured to cause the program to notify a system administrator that the event occurred at the first node.

21. A system for administrating a data mirroring relationship between a first node and a second node, the system comprising:
  means for receiving a notification when an event has occurred at the first node;
  means for determining whether the event can cause the mirroring relationship to fail; and
  means for performing a predetermined task in response to the notification if the event can cause the mirroring relationship to fail; and
  wherein the means for determining whether the event can cause the mirroring relationship to fail includes comparing the event against a list of events.

* * * * *